United States Patent [19]

Rice

[11] Patent Number: 4,906,300
[45] Date of Patent: Mar. 6, 1990

[54] SOLID STATE REACTIONS WITH MGCO3/MGOH

[75] Inventor: Camilla A. Rice, Sandersville, Ga.

[73] Assignee: E.C.C. America Inc., Atlanta, Ga.

[21] Appl. No.: 211,216

[22] Filed: Jun. 23, 1988

[51] Int. Cl.$^4$ .................................................. C09C 1/02
[52] U.S. Cl. ..................................... 106/461; 106/467; 106/468
[58] Field of Search ........................ 106/461, 467, 468

[56] References Cited

U.S. PATENT DOCUMENTS

| | | | |
|---|---|---|---|
| 3,014,836 | 12/1961 | Proctor, Jr. ........................... | 106/486 |
| 3,586,523 | 6/1971 | Fanselow et al. .................... | 106/486 |
| 3,690,907 | 9/1972 | Krsoning et al. .................... | 106/467 |
| 3,753,753 | 8/1973 | Kirby et al. .......................... | 106/468 |
| 3,784,392 | 1/1974 | Bertorelli ............................. | 106/468 |
| 3,876,443 | 4/1975 | Conley et al. ........................ | 106/467 |
| 4,098,762 | 7/1978 | Miyata et al. ........................ | 106/461 |
| 4,381,948 | 5/1983 | McConnell et al. ................. | 106/461 |

Primary Examiner—Paul Lieberman
Assistant Examiner—Willie J. Thompson
Attorney, Agent, or Firm—Klauber & Jackson

[57] ABSTRACT

In the method for producing a low abrasion calcined kaolin clay pigment by providing a feed kaolin which is at least sufficiently fine that substantially 100% by weight of the particles are of less than 1 micrometer E.S.D., and heating said feed in a calciner to a temperature of at least 900° C., and under conditions such that substantially none of said kaolin is heated to a temperature in excess of 1100° C.; a reduction in the abrasivity of the calcined product is achieved by incorporating into the feed from 1 to 4% by weight of $MgCO_3$ and/or $Mg(OH)_2$.

8 Claims, 2 Drawing Sheets

BRIGHTNESS vs % FILLER

SCATTER vs % FILLER

OPACITY vs % FILLER

EFFECT OF MAGNESIUM CARBONATE ADDITION

SOLID STATE REACTIONS WITH MGCO3/MGOH

BACKGROUND OF THE INVENTION

This invention relates generally to calcined clay products, and more specifically relates to an anhydrous white kaolin clay pigment and method of manufacture of same. The pigment is particularly useful as a filler in paper products, but also finds use in other applications, such as in coating of papers. In accordance with the invention a method is disclosed for effectively reducing the abrasion value of this pigment.

In the course of manufacturing paper and similar products, including paperboard and the like, it is well known to incorporate quantities of inorganic materials into the fibrous web in order to improve the quality of the resulting product. In the absence of such "fillers", the resultant paper can have a relatively poor texture due to discontinuities in the fibrous web. The said fillers are also important in improving the printing qualities of the paper, i.e., by improving the surface characteristics of same. The use of appropriate such fillers, further, vastly improves the opacity and the brightness of a paper sheet of a given weight.

A number of inorganic materials have long been known to be effective for many of the aforementioned purposes. Among the best of these materials is titanium dioxide, which can be incorporated into the paper in the form of anatase or of rutile. Titanium dioxide, however, is among the most expensive materials which are so usable. Thus, despite the effectiveness of such material as a filler, its use is limited, and satisfactory replacements have been much sought after.

Among the materials which have thus found increasing acceptance as paper fillers are calcined kaolin clays. Materials of this type are generally prepared by calcining a crude kaolin clay, which may have been initially subjected to prior beneficiation steps in order to remove certain impurities, e.g. for the purpose of improving brightness in the ultimate product. Reference may be usefully had to *Proctor,* U.S. Pat. No. 3,014,836, and to Fanselow, U.S. Pat. No. 3,586,523, and U.S. Pat. No. 4,381,948, which disclosures are representative of the prior art pertinent to the present invention.

Those properties which render a calcined clay pigment particularly valuable for use as a filler are also well known. These include a low abrasion value, and high brightness and opacifying characteristics. The low abrasion is significant in order to ensure that the resultant paper product may be manufactured and processed using conventional machinery without damaging same. The brightness and opacifying characteristics are important in producing an acceptable paper sheet, one which incorporates whiteness, high opacity, good printability and light weight.

Both the brightness characteristics of a given kaolin clay and the opacifying properties of same, when incorporated as a filler in paper, may be quantitatively related to a property of the filler identified as the "scattering coefficient S". The said parameter, i.e. the scattering coefficient S of a given pigment, is a property well known and extensively utilized in the paper technology art, and has been the subject of numerous technical papers and the like. The early exposition of such measurements was made by Kubelka and Munk, and is reported in *Z. Tech Physik* 12:539(1931). Further citations to the applicable measurement techniques and detailed definitions of the said scattering coefficient are set forth at numerous places in the patent and technical literature Reference may usefully be had in this connection e.g., to U.S. Pat. Nos. 4,026,726, and 4,028,173. In addition to the citations set forth in these patents, reference may further be had to *Pulp and Paper Science Technology Vol. II "Paper"*, Chapter 3, by H. C. Schwalbe (McGraw-Hill Book Company, N.Y.).

SUMMARY OF INVENTION

In accordance with the present invention, it has now unexpectedly been found that the abrasion of a calcined kaolin can be markedly decreased by the addition of 1-4% $MgCO_3$ or $Mg(OH)_2$ prior to the calcination step from a typical value on the Breunig scale of 60, to 40. The GE brightness, particle size distribution curve, and scatter properties in paper filling are not affected by this treatment.

The magnesium treated calcined kaolin has a lower abrasion than a normal untreated calcined kaolin. The mechanism for lowering the abrasion appears to be by retarding the growth of mullite and gamma $Al_2O_3$ crystallite size with calcination at temperatures between 900°-1100° C.

DESCRIPTION OF PREFERRED EMBODIMENTS

Figure 1:
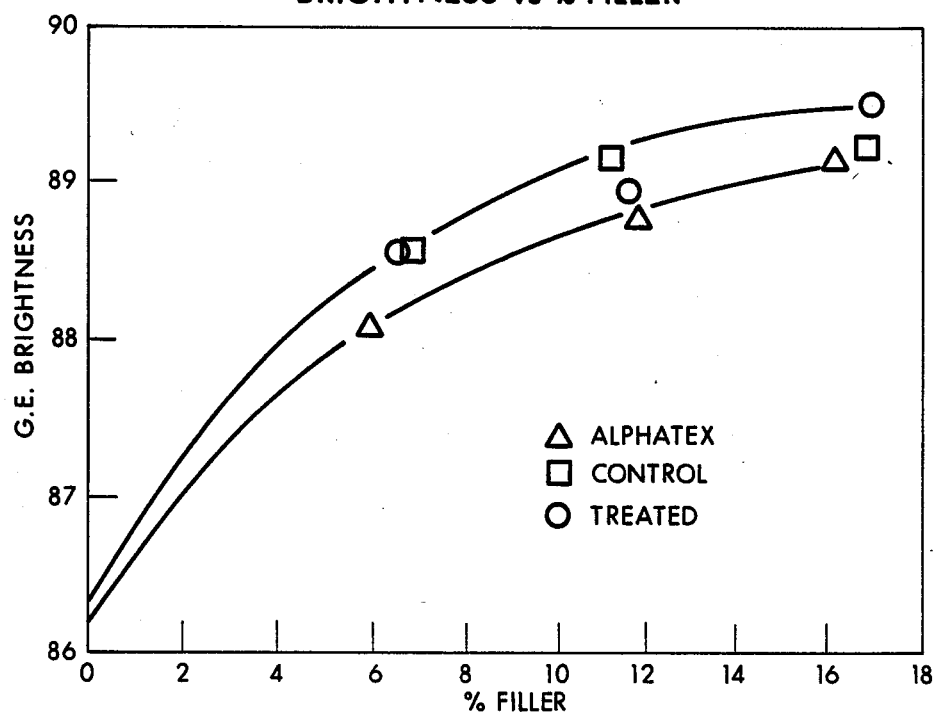
FIG. 1 is a plot of brightness filler in filled paper sheets in which a comparison is filler in filled paper sheets in which a comparison is made between using respectively as filler a magnesium carbonate treated calcined kaolin according to the invention, the untreated calcined kaolin control and Alphatex ®, a commerically available calcined kaolin.

Practice of the present invention will now be illustrated by the following Examples, which are deemed illustrative of both the process taught by the present invention, and of the products yielded in accordance with the invention.

EXAMPLE I

1% $MgCO_3$ was milled once into a fine water washed kaolin (100% < 1µ) The treated kaolin was calcined under temperature conditions as set forth in Example I of McConnell et al, U.S. Pat. No. 4,381,948 along with an untreated control, and the calcined kaolins were milled once in a Micromill pulverizer and abrasion measurements were made. The abrasion of the untreated control was 67.7 (Breunig scale) whereas for the magnesium treated kaolin it was 49.7. The GE Brightness of both calcined Kaolins was 92.8 and the particle size distribution (PSD) was identical. GE Brightness is measured by TAPPI Procedure T646. The procedures for determining Breunig Abrasion are set forth at Table II of U.S. Pat. No. 4,678,517.

EXAMPLE II

About 1% MgCO₃ was milled once into the kaolin described in Example 1. It was calcined along with an untreated control at 1100° C. The abrasion of the once milled feed kaolin was 57.5 and the magnesium treated once milled kaolin was 51.0 on the Breunig scale The GE Brightness of the two calcined products was identical.

EXAMPLE III 1% Magnesium hydroxide was milled once into the kaolin described in Example 1, and calcined at 1080° C. along with an untreated control. The calcined kaolins were milled once, after calcination in a Micromill pulverizer, and abrasion measurements were made using a Bruenig abrasion machine. The abrasinn of the magnesium treated calcined clay was 47.4 while the abrasion of the untreated calcined control was 63.2. The GE brightness of both calcined kaolins was 92.6.

EXAMPLE IV

The magnesium carbonate treated calcined kaolin and the untreated calcined control were evaluated in a filled paper system along with a stock control sample of Alphatex ®. (The latter is a commerically available calcined kaolin, which is a product of the Anglo-American Clays Subsidiary of ECCA America, Inc., assignee of the present application. The procedure for preparing Alphatex is substantially set forth in McCnnnell et al, U.S. Pat. No. 4,381,948.) The 1% MgCO₃ treated system showed a light scatter increase of 19 units with the treatment. This is not a significant improvement, but is important in demonstrating that the paper filling properties of the calcined clay are not altered by the addition of MgC03 prior to calcination.

|  | Normalized Scatter (10%) |
|---|---|
| Control | 656 |
| 1% MgCO₃ | 675 |
| Alphatex | 680 |

Figure 2:
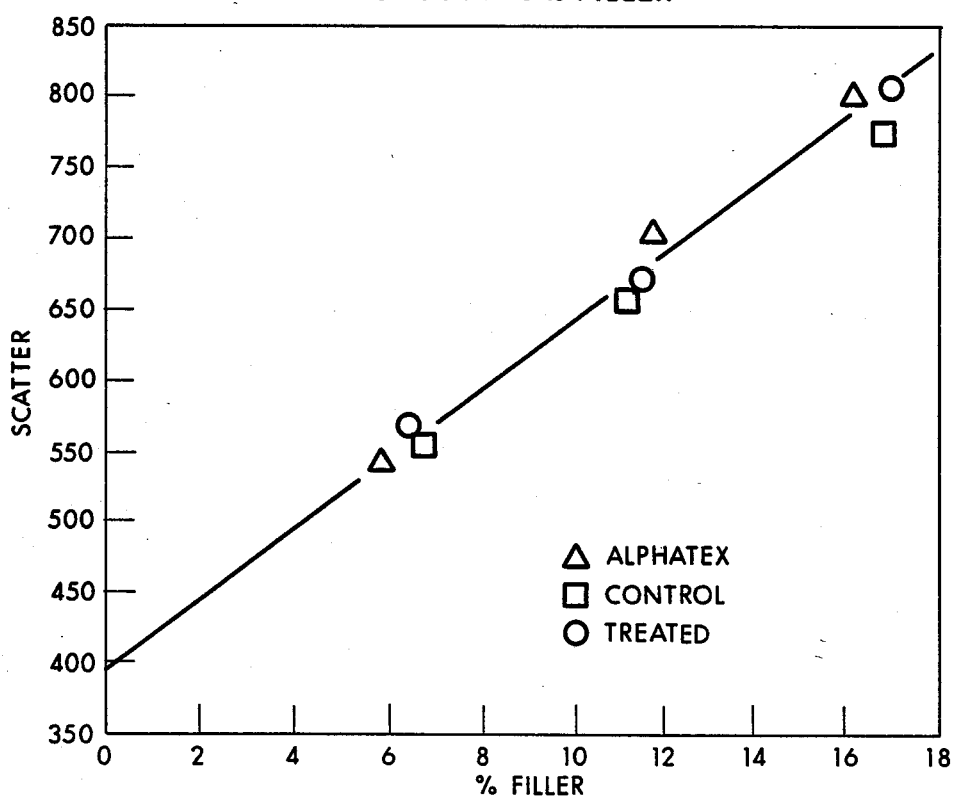
FIG. 2 is a plot of light scatter versus percent filler in an otherwise similar comparative study.
Figure 3:
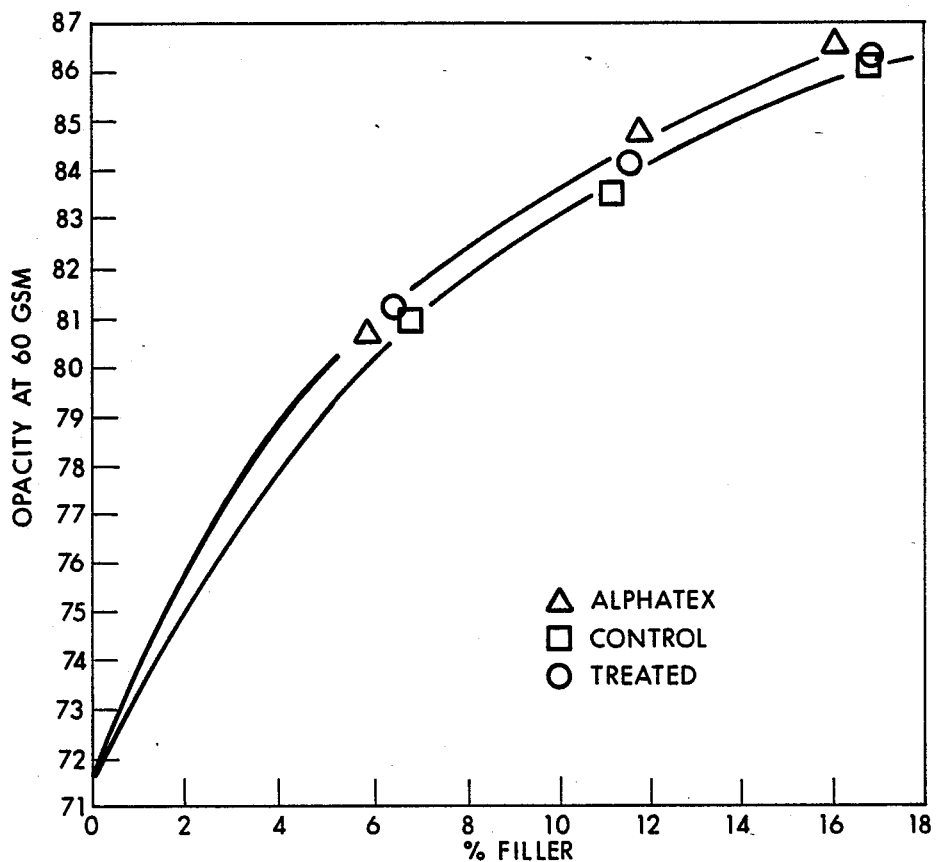
FIG. 3 is a plot of opacity versus percent filler in an otherwise similar comparative study.
Figure 4:
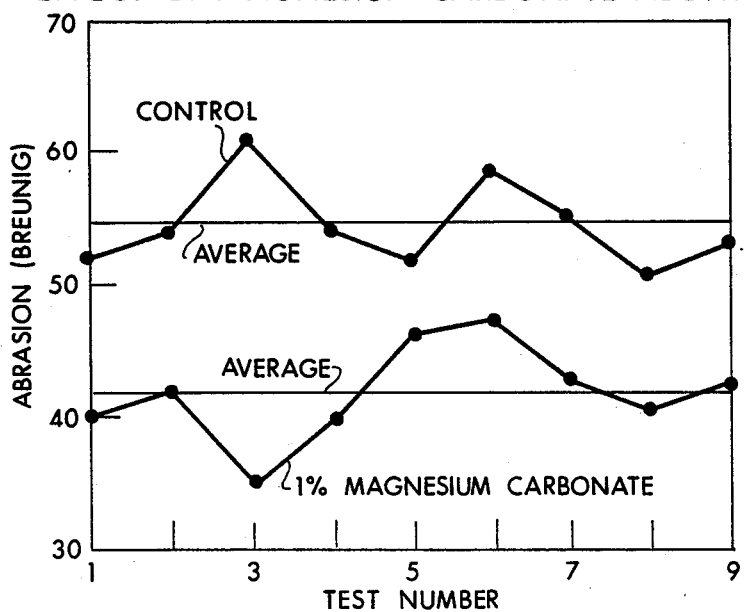
FIG. 4 shows the marked improvement in Breunig abrasion of 1% magnesium carbonate addition to a kaolin that is subsequently calcined, compared with the untreated calcined kaolin control; calcination is carried out for a number of tests, average values being shown by a straight line.

Plots of brightness vs. filler level, scatter vs. filler level and opacity vs. filler level are shown in FIGS. 1 to 3.

EXAMPLE V

2% MgCO₃ and 2% Mg(OH)₂ treatment was carried out repeatedly using different samples of 100%<1μ kaolin as described in Example 1. These samples were calcined, milled once in a Micromill pulverizer and tested for abrasion. The results are given below:

| Breunig Abrasion | |
|---|---|
| Control | Mg(OH)₂ |
| 67.7 | 49.7 |
| 47.5 | 28.2 |
| 49.0 | 37.2 |
| 52.0 | 42.0 |
| 61.0 | 50.8 |
| 54.2 | 47.2 |
| Control | MgCO₃ |
| 52.0 | 40.1 |
| 54.0 | 42.0 |
| 61.0 | 35.0 |
| 54.2 | 40.1 |
| 51.9 | 46.3 |
| 58.7 | 47.4 |
| 55.3 | 42.9 |
| 50.8 | 40.7 |
| 53.1 | 42.6 |

An XRD (X-ray diffraction) study was carried out on a control and the Mg carbonate treated calcined clays. The XRD study showed the retarded growth in crystallite size of the gamma alumina and mullite phases with the addition of the magnesium compound While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

What is claimed:

1. In the method for producing a low abrasion calcined kaolin clay pigment by providing a feed kaolin which is at least sufficiently fine that substantially 100% by weight of the particles are of less than 1 micrometer E.S.D., and heating said feed in a calciner to a temperature of at least 900° C., and under conditions such that substantially none of said kaolin is heated to a temperature in excess of 1100° C.; the improvement enabling a reduction in the abrasivity of the calcined product comprising: incorporating into the said feed from 1 to 4% by weight of an abrasion-reducing agent selected from one or more members of the group consisting of MgCO₃ and 2. A method in accordance with claim 1, wherein said abrasion-reducing agent is intermixed and milled with said kaolin feed.

3. A method in accordance with claim 1, wherein said kaolin feed is prepared by a process including spray drying and milling of an aqueous kaolin slurry to produce said feed; and wherein said abrasion-reducing agent is added to said slurry prior to said spray drying step.

4. A method in accordance with claim 1, wherein said abrasion-reducing agent comprises approximately 1 to 2% by weight of said feed kaolin.

5. A method in accordance with claim 1, wherein said abrasion-reducing agent comprises MgCO₃.

6. A method in accordance with claim 1, wherein said abrasion-reducing agent comprises Mg(OH)₂.

7. A method in accordance with claim 4, wherein said abrasion-reducing agent comprises MgCO₃.

8. A method in accordance with claim 4, wherein said abrasion-reducing agent comprises Mg(OH)₂.

* * * * *